US005902080A

United States Patent [19]

Kopras

[11] Patent Number: 5,902,080

[45] Date of Patent: May 11, 1999

[54] SPIRAL CUTTING TOOL WITH DETACHABLE BATTERY PACK

[75] Inventor: Robert K. Kopras, Black Earth, Wis.

[73] Assignee: Roto Zip Tool Corporation, Cross Plains, Wis.

[21] Appl. No.: 08/891,475

[22] Filed: Jul. 11, 1997

[51] Int. Cl.$^{6}$ .................................. B23C 1/20; B27C 5/10

[52] U.S. Cl. .................. 409/182; 30/DIG. 1; 144/136.95

[58] Field of Search .................................... 409/175, 182, 409/181; 606/80, 167; 310/47, 50; 144/136.95, 154.5, 135.2; 408/241 R; 30/DIG. 1, 388, 390; 173/217, 163, 170

[56] References Cited

U.S. PATENT DOCUMENTS

| | | | |
|---|---|---|---|
| 3,757,194 | 9/1973 | Weber et al. | 30/DIG. 1 X |
| 4,779,687 | 10/1988 | Schreiber et al. | 173/170 |
| 4,881,294 | 11/1989 | Riedl | 408/241 X |
| 4,930,583 | 6/1990 | Fushiya et al. | 173/170 X |
| 5,033,552 | 7/1991 | Hu | 173/217 |
| 5,054,563 | 10/1991 | Zapf | 173/163 |
| 5,121,803 | 6/1992 | Hartmann et al. | 408/241 X |
| 5,298,821 | 3/1994 | Michel | 310/47 |
| 5,451,123 | 9/1995 | Fertitta, Jr. | 409/182 |
| 5,553,675 | 9/1996 | Pitzen et al. | 173/217 |
| 5,653,033 | 8/1997 | McDowell | 30/390 |
| 5,671,815 | 9/1997 | Kabatnik et al. | 173/217 |
| 5,813,805 | 9/1998 | Kopras | 408/241 R |

FOREIGN PATENT DOCUMENTS

| | | | |
|---|---|---|---|
| 281880 | 11/1989 | Japan | 30/DIG. 1 |

OTHER PUBLICATIONS

Brochure by Roto Zip Tool Corporation for ROTO MITE, published at various times prior to 1996.

Operating Guide for SPIRACUT published by Roto Zip Tool Corporation, Jan. 1996.

*Primary Examiner*—William Briggs
*Attorney, Agent, or Firm*—Foley & Lardner

[57] ABSTRACT

A detachable battery pack is connectable to hand-held power tools, such as spiral cutting tools, in which cuts are made by positioning the axis of the cutting tool motor housing perpendicular to a workpiece surface, and moving a cutting tool bit through the workpiece in a direction perpendicular to the axis of the bit to remove material from the workpiece. The battery pack allows the cutting tool to be utilized without an electric cord and without the need of a power source near-by, thereby increasing maneuverability, safety, and range of use. The battery pack is connected to the motor housing of the power tool by being received by a receptacle. The receptacle is preferably formed to include one or more storage compartments therein, accessible through apertures in the receptacle for storage of additional cutting tool bits. A sliding door on the receptacle may be provided to allow access to the storage compartments, and to close the compartments to secure items stored therein during operation of the cutting tool. The receptacle extends outwardly beyond the motor housing over a handle so that the weight of the battery pack is centered over the handle.

19 Claims, 3 Drawing Sheets

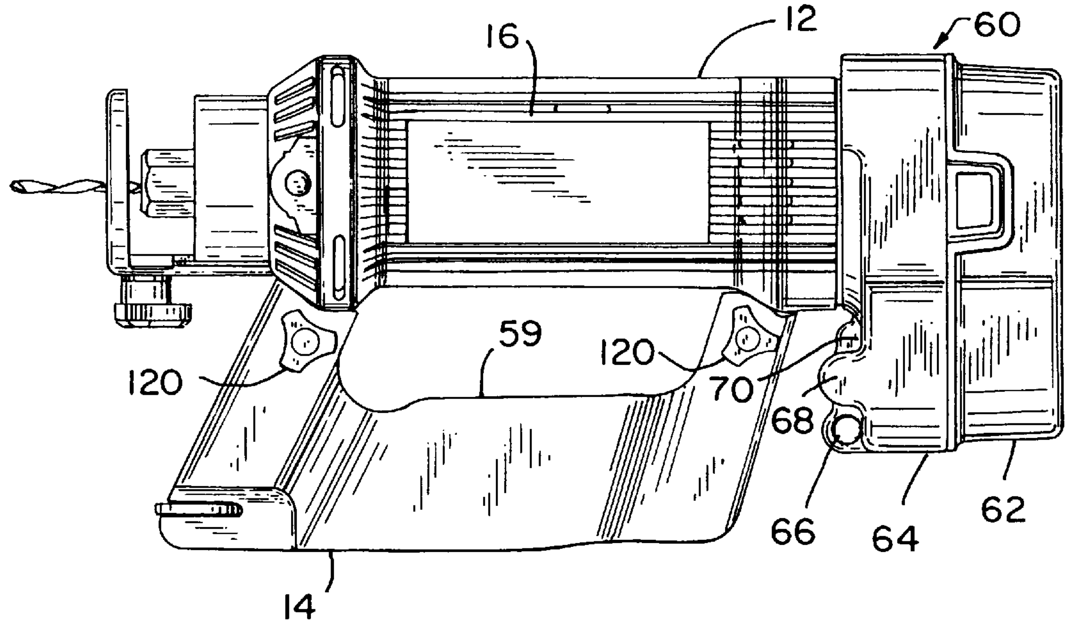
FIG. 2
FIG. 4
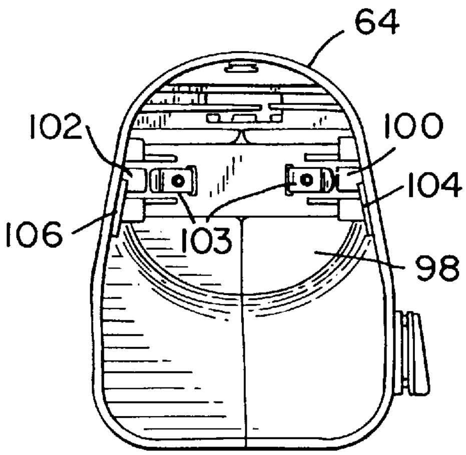
FIG. 5
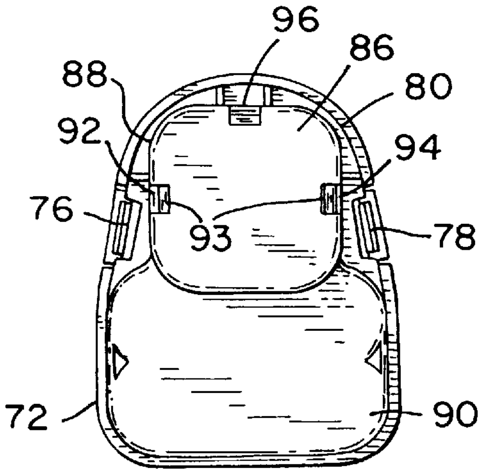

SPIRAL CUTTING TOOL WITH DETACHABLE BATTERY PACK

FIELD OF THE INVENTION

This invention pertains generally to hand-held power tools such as spiral cutting tools, and more particularly to rechargeable battery pack assemblies for such power tools.

BACKGROUND OF THE INVENTION

A spiral cutting tool is a hand-held power tool having an electric motor that rotates a spiral cutting tool bit at high speeds. Such tools are particularly useful for cutting sheets of material such as drywall and plywood. The spiral cutting tool bit includes a sharp cutting edge that is wrapped in a spiral around the axis of the bit. The spiral cutting tool bit is designed for cutting perpendicularly to the axis of the bit. The electric motor that drives the bit is enclosed in a motor housing. The motor housing is generally cylindrical in shape, with the spiral cutting tool bit extending from one and of the motor housing along the axis of the housing. The spiral cutting tool is used to remove material from a workpiece by moving the rotating spiral cutting tool bit through the workpiece in a direction perpendicular to the axis of rotation of the bit. It is conventionally operated by grasping the motor housing with one or both hands, turning on the electric motor to begin high speed rotation of the spiral cutting tool bit, spinning the cutting bit into a work piece, such as a piece of wood, and then moving the cutting bit through the workpiece in a direction perpendicular to the axis of the spiral cutting tool bit by moving the motor housing in a direction parallel to the plane of the workpiece surface while keeping the axis of the motor housing generally perpendicular to the workpiece surface.

The spiral cutting tool is typically powered by means of an electric cord attached to a power source. However, use of a cord has several drawbacks. First, the cord may limit the cutting motions of the operator by being in the way. Second, it presents a possible safety hazard, as a cord over which the operator may trip or which may entangle with other objects during use. Third, it limits the range of operation of the tool; when a power source is not nearby, the operator must use an extension cord, or not use the tool at all. In addition, the operator may waste time in travelling to and from the power source to plug and unplug the cord.

Spiral cutting tool bits are available in various sizes and configurations specifically designed for the cutting of different workpiece materials. A spiral cutting tool operator will likely desire to have extra bits conveniently at hand. Spiral cutting tool bits are changed by removing bits from and inserting bits into a chuck connected to the spiral cutting tool motor. This process typically requires use of a wrench or other tool. Extra spiral cutting tool bits and other spiral cutting tool accessories may be brought to a work site in a toolbox or other conventional storage container, wherein they will likely become mixed up with other tools, and accessories for other power tools, such as conventional drill bits. This can result in wasted time as the spiral cutting tool operator searches through his tool box for the desired spiral cutting tool bit, wrench, etc. In addition, the tool box may not be convenient to the work space in which the operator is using the spiral cutting tool, resulting in additional wasted time in walking to and from the tool box to retrieve the accessories. It generally is not convenient to bring a separate container to the work site for the specific purpose of holding spiral cutting tool bits and accessories alone.

SUMMARY OF THE INVENTION

The improved spiral cutting tool of the present invention includes a detachable battery pack that allows extensive continuous use of the tool without the requirement of an electric cord or of a near-by power source. The battery pack is preferably rechargeable, and is detachably attached to the end of the power tool housing opposite the cutting bit such that the batteries are electrically connected to the motor. A receptacle at the end of the power tool housing receives and securely holds the battery pack, preferably with the weight of the battery pack centered over a handle connected to the housing. In this manner, the weight of the battery pack is balanced against the weight of the motor and housing when the tool is used in the vertical position to minimize the effort of the operator using the tool.

The battery pack includes a case in which rechargeable batteries are contained. The receptacle includes conductors for transmitting electricity from the battery to the cutting tool motor. The battery pack further includes means for easily attaching and detaching the battery pack from the receptacle. The rechargeable battery or batteries contained within the battery pack may be recharged by a recharger into which the battery pack easily and securely fits.

The case or enclosed housing of the battery pack is preferably made from a hard and strong plastic material, such as glass filled nylon. The battery pack may be formed by molding the pack in essentially two asymmetrical halves. The two halves consist of the inward half, which is adjacent to the motor and which fits into the receptacle of the motor housing, and an outward half, which is opposite to the motor, and which extends out from the receptacle. The outward half may include a flared edge or lip and a ridge along the lip against which the inward half rests, and which itself rests upon the edge of the receptacle when attached to the motor housing. The outward half further contains shaped surface areas on the outside rim with structures affixed thereto by which the battery pack can be attached to and detached from the receptacle. Such surface areas are preferably indented from the outer rim so that they can be engaged by spring clamps associated with the receptacle. The outward half may be finished to match the outer material design of the motor housing, and may further contain flattened surfaces onto which printed material may be attached or imprinted.

The receptacle is shaped to accommodate the battery pack and to allow the battery pack to fit snugly within the receptacle such that use of the tool either with or without the handle is not hampered. The receptacle contains electrical connectors by which the electrical outlets of the battery pack may be connected to the tool motor, such as metal prongs. The receptacle contains holding means by which the battery pack is securely attached to the receptacle, such as a catch into which the spring clamps of the battery pack fit snugly.

The receptacle may contain compartments which may be used to store various spiral cutting tool accessories, such as extra spiral cutting tool bits. Such compartments are preferably on the outside of the outer surface adjacent to the handle, and traverse the width of the receptacle. They may be attached to the receptacle or be an integral part of it. A compartment door may be provided to cover the aperture of the receptacle compartments. The door preferably rotates around and off the aperture of the compartment. The door also preferably can be locked in place when the tool is in use, such as by a raised ridge on the inside of the cover which snaps into place when the door is rotated over the compartment opening, thus closing the compartment.

The rechargeable battery pack of the present invention is preferably easily attached to and detached from the motor housing of a spiral cutting tool. It can also be easily inserted into and removed from a battery charger, if desired.

The rechargeable battery pack assembly of the present invention allows a spiral cutting tool operator to use the tool without an electric cord, with greater freedom of motion and an increased range of cutting motions orientations than are possible for tools requiring a cord which could otherwise get in the way.

Further objects, features, and advantages of the invention will be apparent from the following detailed description of the invention taken in conjunction with the accompanying drawings.

BRIEF DESCRIPTION OF THE DRAWINGS

In the drawings:

FIG. 2 is a side view of a spiral cutting tool showing the rechargeable battery pack of the present invention attached to the cutting tool.

FIG. 4 is an end view showing the cavity of the receptacle on the spiral cutting tool into which a detachable battery pack fits in accordance with the present invention.

FIG. 5 is an end view of a detachable battery pack which fits into the cavity of a receptacle, as shown in FIG. 4, in accordance with the present invention.

DETAILED DESCRIPTION OF THE INVENTION

Figure 1:
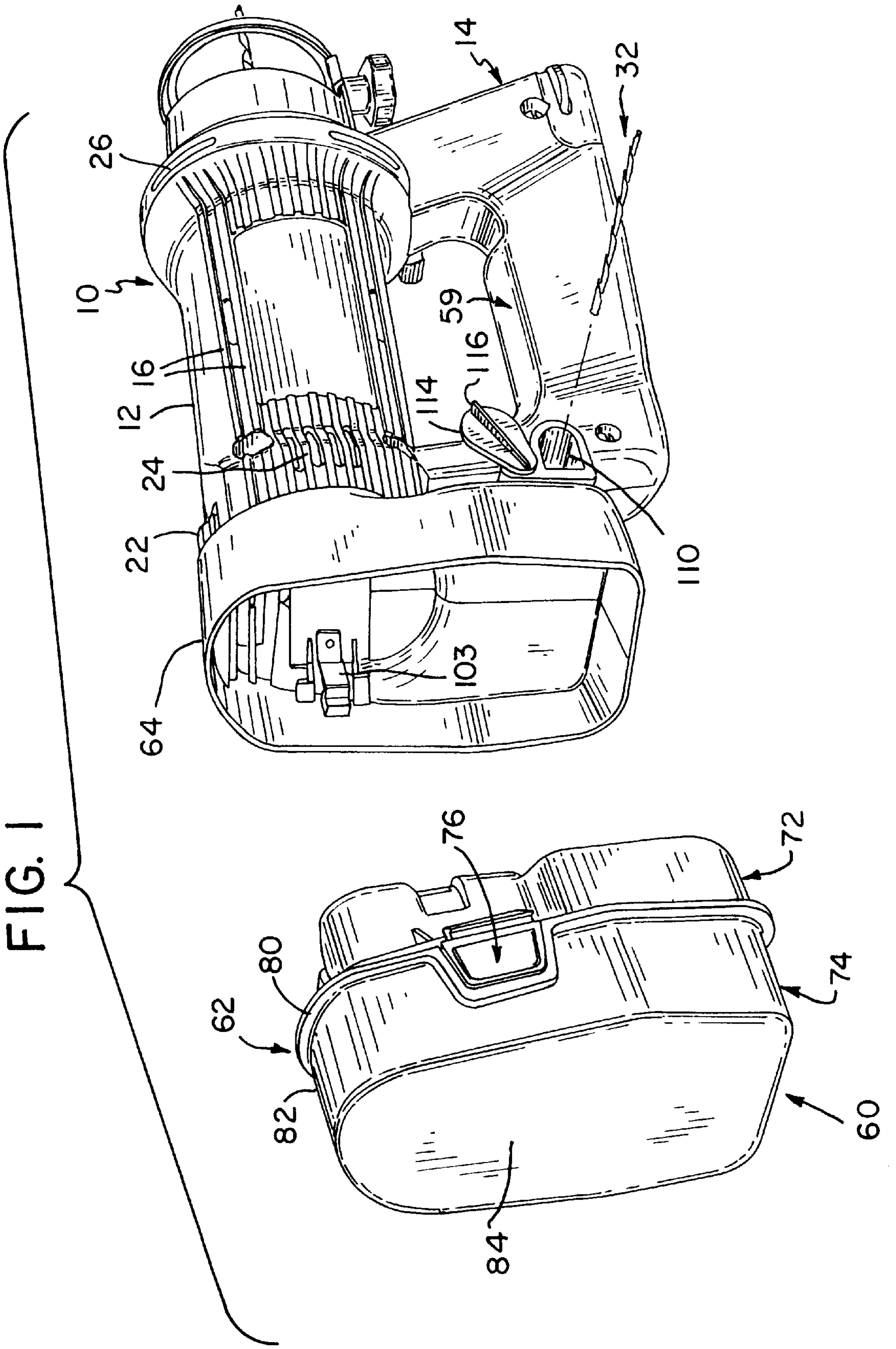
FIG. 1 is a perspective view of a spiral cutting tool including a rechargeable battery pack in accordance with the present invention.

A spiral cutting tool with a battery pack assembly in accordance with the present invention is shown generally at 10 in FIGS. 1 and 2. The spiral cutting tool 10 includes a motor housing 12 to which a detachable handle 14 may be connected. The spiral cutting tool further includes a rechargeable battery pack assembly 60 which comprises a detachable rechargeable battery pack 62 attachable to the motor housing 12, preferably by means of a receptacle 64 into which the detachable battery pack 62 fits.

The present invention is an improved cutting tool having a detachable battery pack. The basic cutting tool may be substantially the same as existing cutting tools, and an example of a suitable cutting tool structure is described below.

The motor housing 12 is made of an electrically insulating material, such as hard plastic The motor housing 12 is generally cylindrical in shape and may include raised gripping surfaces 16 that allow a firm grip on the cutting tool 10 to be maintained when the cutting tool 10 is grasped around the motor housing 12.

An electric motor (not visible in FIG. 1) is enclosed within the motor housing 12. An exemplary electric motor that may be employed is a conventional 4 ampere 115–120 V, AC electric motor with a no-load rotation speed of 30,000 RPM. The motor receives electrical power through the detachable and preferably rechargeable battery pack 62. The electric motor is turned on and off by an on/off switch 22 on the motor housing 12. The electric motor of the cutting tool 10 drives a motor shaft. A fan (not shown), located within the motor housing 12, is preferably attached to the motor shaft. When the motor is turned on, by means of the on/off switch 22, the fan is rotated at a high speed to draw air through the motor housing 12 and across the electric motor to thereby cool the motor. For this purpose, intake air vents 24 and exhaust air vents 26 are preferably provided in the motor housing 12. Cool air is thus drawn by the motor fan into the motor housing 12 through the air intake vents 24 to cool the electrical motor, with warm air exhausted from the motor housing 12 through the exhaust air vents 26.

Figure 3:
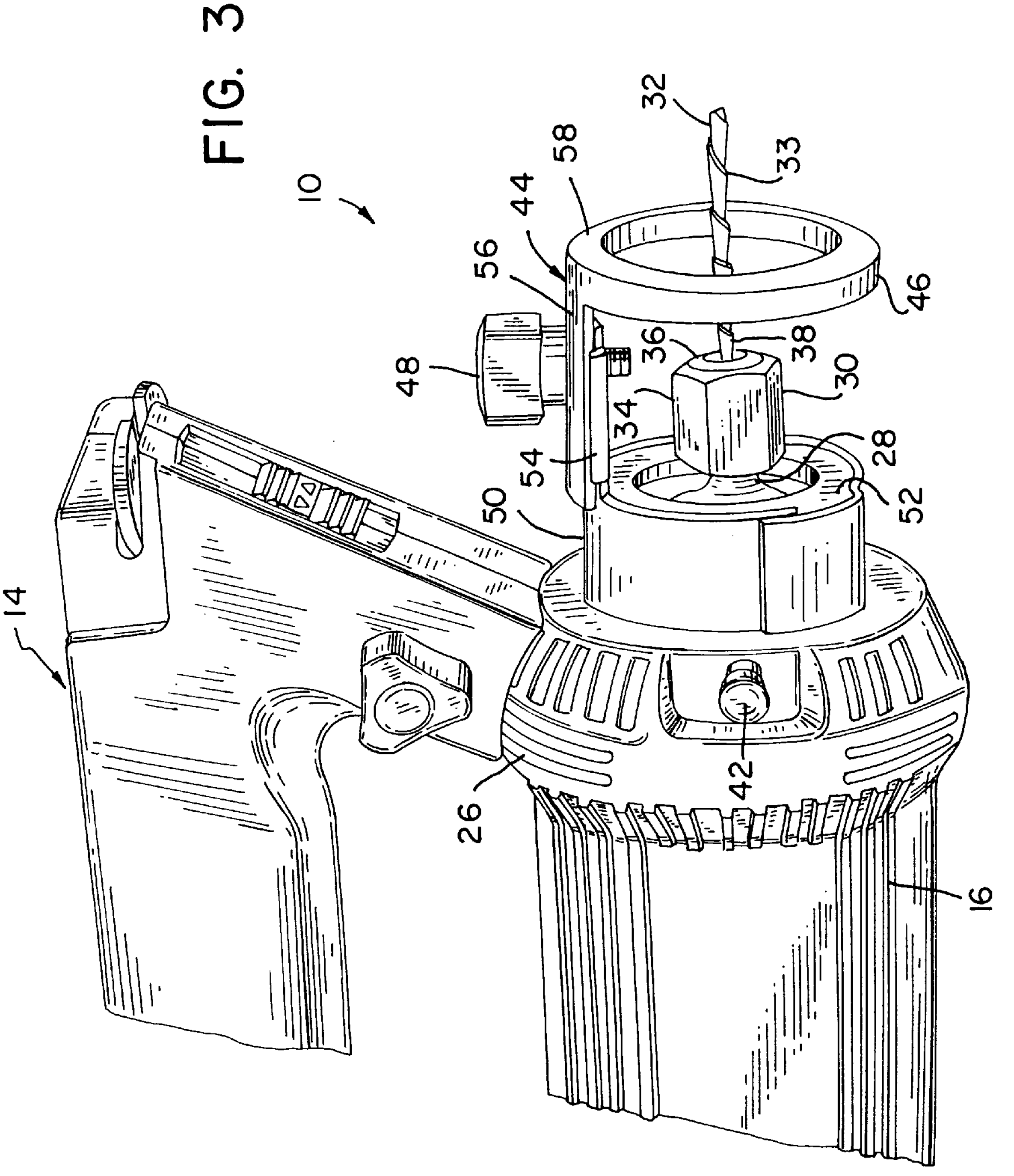
FIG. 3 is a perspective view of a spiral cutting tool showing the cutting end.

The cutting end of the power tool is shown in FIG. 3. An end of the motor shaft 28 extends from one end of the motor housing 12 along the central axis thereof Attached to the end of the motor shaft 28 is a mechanical chuck structure 30 for securing a spiral cutting tool bit 32 to the motor shaft 28. The spiral cutting tool bit 32 has a cutting edge 33 spiraled around the axis of the bit 32. This cutting edge 33 is designed such that the spiral cutting tool bit 32, when rotated at high speed, will cut through a workpiece in a direction perpendicular to the axis of the bit 32. In this cutting process significant force is applied to the cutting tool bit 32 perpendicular to the axis thereof. Thus, although a conventional drill type chuck may be used for the structure 30 that mechanically connects the bit 32 to the motor shaft 28, the preferred structure for securing the bit 32 to the shaft 28 is a collet type system 30. The collet bit attachment system 30 includes a collet nut 34 and a collet 36 centered axially within a central aperture of the collet nut 34. The collet nut 34 is mounted on a threaded end of the motor shaft 28. To secure the bit 32 to the motor shaft 28 a shank 38 of the bit 32 is inserted into the central aperture of the collet 36. The collet nut 34 is then tightened, first by hand and then with a wrench 40, until the bit 32 is held securely As the collet nut 34 is tightened down on the threaded end of the shaft 28, the collet 36 is compressed within the collet nut 34 between a partially closed end of the collet nut 30 and the shaft 28. The collet 36 is slotted and has tapered ends such that when the collet 36 is compressed between the collet nut 34 and the shaft 28 the collet is compressed radially causing the central aperture of the collet 36 to close tightly around the shank 38 of the spiral cutting tool bit 32. To remove the bit 32 from the motor shaft 28, the collet nut 34 is loosened, using the wrench 40, until the bit 32 can be easily removed from the central aperture of the collet 36.

A shaft lock pin 42 is used to prevent rotation of the motor shaft when the collet nut 34 is being loosened and tightened. The shaft lock pin 42 extends through the motor housing 120 When the shaft lock pin 42 is depressed, it engages the motor shaft 28, preventing rotation of the shaft, and allowing the collet nut 30 to be loosened and tightened When the shaft lock pin 42 is released, a spring (not shown) attached to the shaft lock pin 42 causes the shaft lock pin 42 to become disengaged from the motor shaft 28, allowing free rotation thereof.

To set the depth of cut to be made by the spiral cutting tool 10, an adjustable depth guide assembly 44 is provided. The depth guide assembly 44 includes a depth guide 46, a threaded locking knob 48, and a depth guide bracket 50. The depth guide bracket 50 is attached to the cutting tool housing 12 around the location where the motor shaft 28 emerges from the housing 120 The depth guide bracket 50 may be attached to the housing 12 in various conventional manners. Preferably, the depth guide bracket 50 may be made detachable from the housing 12. A housing collar 52, which is part of and extends axially from the motor housing 12, may be provided around the motor shaft 28. The collar 52 includes a recessed channel (not shown) around an outer circumference thereof which interlocks with a protrusion on the depth guide bracket 50. To attach the depth guide bracket 50 to the collar 52, the protrusion on the depth guide bracket 50 is aligned with a notch in the collar 52, and the bracket 50 is pushed down over the collar 52 until the protrusion on the bracket 50 is located within the collar channel. The depth guide bracket 50 is then rotated around the collar 52 to lock the protrusion on the bracket 50 within the channel on the collar 52. A metal band (not shown) may be placed in a second channel in the outer circumference of the housing collar 52. This metal band has a protrusion which can be compressed, and thus acts as a spring. A hole (not shown) is provided in the depth guide bracket 50 which may be aligned with the spring protrusion from the housing collar 52. When the bracket 50 is rotated about the collar 52 to lock the protrusion on the bracket 50 within the channel in the collar 52 the protrusion on the spring is aligned with the hole in the bracket 50, causing the protrusion to spring into the hole, thereby securely locking the depth guide bracket 50, and the entire depth guide assembly 44, onto the housing collar 52 and the housing 12.

The depth guide bracket 50 includes an extension 54 extending in an axial direction from an edge thereof The extension 54 includes a threaded hole into which the threaded depth guide locking knob 48 may be threaded. The depth guide 46 includes a corresponding extension 56 extending in an axial direction from an edge thereof and which is aligned with the extension portion 54 of the depth guide bracket 50. The axially extending portion 54 of the depth guide bracket 50 preferably includes a flange guide section extending along the sides thereof to help keep the axially extending portion 56 of the depth guide 46 aligned on the same axis with the axially extending portion 54 of the depth guide bracket 50. The axially extending portion 56 of the depth guide 46 includes an axial slot along its length. The threaded shaft of the depth guide locking knob 48 passes through the slot in the axially extending portion 56 of the depth guide 46. The depth of cut may be set by loosening the locking knob 48, moving the depth guide 46 in an axial direction by sliding the axially extending portion 56 thereof along the axially extending portion 54 of the depth guide bracket 50 (with the slot in the axially extending portion 56 of the depth guide 46 sliding around the threaded portion of the depth guide locking knob 48), and then tightening the depth guide locking knob 48 into the hole in the axially extending portion 54 of the depth guide bracket 50 and down upon the axially extending portion 56 of the depth guide 46 to lock the depth guide 46 in position on the depth guide bracket 50. Note that a locking washer (not shown) may preferably be placed around the threaded portion of the locking knob 48, between a head portion of the locking knob 48 and the axially extending portion 56 of the depth guide 46, to more securely fix the depth guide 46 in place when the locking knob 48 is tightened down upon the axially extending portion 56 thereof. When locked into position, the depth guide 46 provides a depth guide surface 58 which lies in a plane perpendicular to the axis of the spiral cutting tool bit 32.

A detachable handle 14 may be attached to the motor housing 12 of the cutting tool 10. The handle 14 includes a gripping surface 59 which is preferably contoured in shape so that the handle 14 may be comfortably grasped in the hand of an operator of the cutting tool 10. The handle gripping surface 59 is aligned substantially parallel with the axis of the cutting tool housing 12.

In the present invention, the battery pack assembly 60 is designed such that the battery pack 62, when mounted on the motor housing 12, forms an essentially unitary structure with the motor housing 12. The battery pack assembly 60 is preferably weighted and contoured such that the heft and stability of the spiral cutting tool both during use and transient storage are not adversely affected. This is accomplished by preferably attaching the battery pack 62 to the motor housing 12 of the cutting tool by way of a receptacle 64. This preferred means for attaching the battery pack 62 to the cutting tool 10 is illustrated in FIGS. 1 and 2. Note that other similar structures, and variations on the structures described, may also be used for detachably attaching the rechargeable battery pack to the cutting tool 10.

The rechargeable battery pack assembly 60 of the present invention allows the cutting tool 10 to be used without the need of a power cord. This eliminates both the constraints imposed by the cord, such as interference with cutting activity during use of the tool, possible tangling of the cords and the necessity of working near a power source. Thus, the battery pack assembly 60 facilitates convenient use of the cutting tool 10, as well as increasing its range of utilization. However, it will be necessary to replace or recharge the battery or batteries (as used herein, "battery" may refer to one or more individual cells or batteries of cells) contained within the battery pack 62 between uses. Thus, the battery pack 62 is preferably easily detached from the cutting tool 10 and easily placed into a recharger, and then easily reattached to the cutting tool 10. Such ease of detaching and reattaching is facilitated by the shape of the battery pack 62, and by the use of spring clamps 76 and 78 on the battery pack itself which securely fasten the battery pack 62 to the cutting tool 10 and to the battery recharger.

The detachable rechargeable battery pack 62 of the present invention includes a case or an enclosed housing in which rechargeable battery or batteries are contained (batteries, not shown, are conventional and any suitable and preferably rechargeable commercial battery may be utilized). The case or enclosed housing of the battery pack 62 is preferably made of an electrically insulating material such as hard plastic. A preferred material for forming the battery pack case is glass filled nylon. The battery pack case may be formed of such a material in two asymmetric halves 72 and 74 by a conventional molding process. The two halves 72 and 74 are then joined together to form the complete battery pack. The interior of each half is appropriately configured to contain the rechargeable battery. The two halves consist of an inward half, 72, which is adjacent to the motor and which fits into the receptacle 64 of the motor housing, and an outward half, 74, which is opposite to the motor, and which may extend out from the receptacle 64. The outward half 74 of the case may have a flared lip and a raised ridge 80 around the rim 82 surrounding the inner cavity into which the batteries are placed, and against which the inward half 72 rests, and which itself rests upon the rim of the receptacle 64 when attached to the motor housing 12. The outward half 74 of the case further contains at least two shaped surface areas on the outside rim to which means may be affixed by which the battery pack 62 can be attached to and detached from the receptacle 64. Such surface areas are preferably indented from the outer rim and such attachment means preferably comprise spring clamps 76 and 78. The spring clamp may comprise a separate plastic plate which slides into the indented shaped surface area of the outer rim 80 and which lies on top of a metal spring which may be depressed by squeezing the plastic plate inwardly. The exterior of the outward half 74 may be finished to match the outer material design of the motor housing 12, and may further contain a flattened back, on which printed material may be attached or imprinted The inward half 72 of the case may be finished in a smooth finish to slip easily into the receptacle 64 of the motor housing 12. The inward half 72 contains shaped openings in the surface area 86 which lies against the motor housing 12 into which means may be fitted by which the battery of the battery pack 62 is electrically connected to the cutting tool motor. Such means are preferably metallic prongs 103. Preferably, the inward half contains three such shaped openings, one at the top (or end opposite the handle) 96 and one on either side, 92 and 94, of the case. The inward half may further contain a shaped lip and an indentation 88 around the outer edge, which lies against the lip of the outward half 74, to assist in holding the inward half 72 firmly in place against the outward half 74. The lip may contain shaped surface areas which are complementary to those of the outward half 74 which contain the spring clamps; the indentations in the inward half 72 allow the spring clamps 76 and 78 to be depressed.

The preferably rechargeable battery may be placed into the interior of the battery pack 62, and the two battery pack halves 72 and 74 joined together to form the complete battery pack 62. The two halves may be joined together by, for example, an adhesive, or by screws. Thus, the battery pack 62 may be reversibly closed, in which case it may be reopened to remove and replace the battery contained therein, or alternatively, it may be permanently sealed to prevent access to the rechargeable battery The detachable rechargeable battery pack of battery pack assembly is attached to the power tool by means of a receptacle 64 formed at the end of the tool housing 12 opposite to that from which the shaft 28 extends The receptacle 64 may be attached to the tool housing 12, or it may be formed as an integral part of the housing 12; preferably, it is an integral part of the tool housing 12. The receptacle 64 is preferably made of an electrically insulating material such as hard plastic. If formed as an integral part of the power tool housing, the material is the same as that of the housing. The receptacle 64 can be formed with the housing by a conventional molding process. The receptacle 64 and the housing 12 may be formed in two symmetric halves, a right half and a left half which are joined together by means of an adhesive or by means of screws, clips, or similar fastening means, or by a combination of these. Where the halves are joined by screws, interconnecting channels may be formed in each half of the receptacle which accommodate the screws which when screwed into the interconnecting channel join the receptacle halves. A preferred embodiment is a screw channel 66 located at the base of the receptacle 64, on the outside facing the cutting end, as shown in FIG. 2. Alternatively, or in addition, if the halves are joined by clips, the two receptacle halves may be configured such that complementary locking means are provided into which clips may be fitted, thus securely fastening the two halves together.

The cavity of the receptacle 64 is contoured so that the battery pack 62 fits snugly within it, as illustrated in FIGS. 4 and 5. The receptacle 64 is preferably formed to extend outwardly beyond the housing and over the handle 14, as shown in FIGS. 1 and 2. Preferably, the top of the receptacle 64 and the battery pack 62 therein are aligned with the top of the power tool housing 12, while the bottom of the receptacle and the bottom of the battery pack 62 extend beyond the housing but not below the bottom of the detachable handle 14. The weight of the portion of the battery pack that extends outwardly from the housing 12 is centered over the handle when the tool is vertical to provide the greatest comfort for a user holding the tool by the handle. Structural elements in the receptacle 64 facilitate the placement of the battery pack 62 into the receptacle 64 and the attachment of the battery pack 62 to the motor housing 12, as illustrated in FIG. 4. In a preferred embodiment, the exterior surface of the inward facing half 72 of the battery pack 62 case contains an upper portion 86 which slightly protrudes over the lower portion 90; the receptacle 64 contains a complementary recessed upper portion 98 into which the protruding portion 86 of the battery pack case fits.

The cavity of the receptacle 64 contains openings 100 and 101 through which conductors, such as metal prongs 103, may be inserted by which the battery of the battery pack 62 may be electrically connected to the motor. Metallic prongs 93 in openings 92 and 94 on the inward facing half of the battery pack 62, as illustrated in FIG. 5, are positioned so as to come into contact with similarly situated prongs 103 in openings 100 and 102 in the receptacle 64, as illustrated in FIG. 4, thus completing the circuit between the batteries and the motor contained within the housing 12.

The receptacle 64 further includes holding means by which the battery pack 62 is securely attached to the receptacle 64. Such means are preferably a catch into which the spring clamps 76 and 78 of the battery pack 62 fit snugly. The catch may comprise raised ridges 104 and 106 just inside the outer edge of the receptacle 64, positioned to connect with a similar ridge on the end of the spring clamps 76 and 78 of the battery pack 62. When the battery pack 62 is fitted into the receptacle 64, the ridges on the clamps 76 and 78 are positioned behind the ridges 104 and 106 on the receptacle 64, and the pack 62 is held securely in place.

The battery pack 62 is attached to the housing 12 by placing in into the receptacle 64. The spring clamps 76 and 78 may be depressed while placing the battery pack 62 into the receptacle 64; alternatively, the battery pack 62 may simply be pushed into the receptacle 64. The raised ridges of the spring clamps 76 and 78 slip past the raised ridges 104 and 106 of the receptacle 64, and the spring then pushes the clamp ridges outward, thus locking the battery pack 62 into place. The battery pack 62 is removed from the receptacle 64 by depressing the spring clamps 76 and 78, thereby disengaging the interlocking ridges of the spring clamps 76 and 78 and the receptacle 64, and the battery pack 62 is slid out from the receptacle 64.

The configuration of the receptacle 64 and its attachment to the motor housing 12 may include hollow compartments or chambers within the receptacle. Such compartments are preferably at the base of the receptacle 64, which is the end extending below or beyond the motor housing 12 of the tool. Such a compartment may consist of a chamber 68 which extends across the receptacle base; an aperture to the chamber 110 which is preferably located on the same side as the head of the screw (not shown) which if present fastens the two halves of the receptacle 64 together. This compartment location provides convenient storage. For example, as illustrated in FIG. 1, spiral cutting tool bits 32 may be stored conveniently in a compartment 68 positioned in the base of the receptacle 64.

The storage compartment 68 is accessed via an aperture 110 in the base of the receptacle 64. To prevent objects stored in the compartment 68 from sliding out during use of the spiral cutting tool 10 a door 114 may be provided to cover the aperture 110. The door 114 may be opened to access the storage compartment 68, and closed to keep articles inserted into the storage compartment 68 securely contained therein The door 114 is preferably rotatable, such that it rotates around and off the aperture 110 of the compartment 68. The door 114 is preferably attached to the receptacle 64 by means of a rod which is attached to one end of the door; the rod is then attached to the receptacle just above the aperture 110 such that the door may rotate around the rod and thus off the aperture 110. Preferably, the rod is inserted into a hollow tube 70 in the receptacle 64 just above the compartment 68; the rod may also be attached via a spring to the receptacle 64. The door 114 may contain gripping means on the outside to facilitate rotating the door around; the gripping means may consist of a raised ridge 116. The door 114 also preferably contains means for locking the door 114 in place when the tool is in use; such locking means may consist of a raised ridge on the inside of the door 114 which snaps into place when the door 114 is rotated over the compartment aperture 110, thus closing the compartment 68.

The compartment 68 in the power tool battery pack receptacle 64 allows power tool accessories, such as extra cutting tool bits 32, to be kept conveniently at hand, and separate from other tools and accessories. It should be noted that a storage compartment of different size and shape than that previously described may be incorporated into the receptacle. Also, various types of doors or other covers may be used to close off or access the compartment The present invention facilitates the safe and convenient operation and use of the spiral cutting tool 10. For the most accurate use of the spiral cutting tool 10, a detachable handle 14 may be secured to the tool housing 12. A conveniently accessible spiral cutting tool bit 32 may be removed from the storage compartment 68 within the receptacle 64. Alternatively, a spiral cutting tool bit 32 may be removed from a storage compartment in the handle or from a separate storage unit. A wrench may be obtained from a storage compartment in the handle or from a separate storage unit.

To attach the bit 110 to the cutting tool 10, the shaft lock pin 42 is depressed, to keep the motor shaft 28 from rotating. A wrench is then used to loosen the collet nut 30, and the shank 38 of the bit 32 is placed in the central aperture of the collet 36. With the shaft lock pin 42 still depressed, the collet nut 30 is tightened, thereby tightening the collet 36 around the shank 38 of the bit 32, securing the bit 32 to the shaft 28 of the cutting tool 10. The shaft lock pin 42 may then be released, and the wrench returned to its original storage compartment. The depth guide 46 may be adjusted by loosening the depth guide locking knob 48, sliding the depth guide 46 axially to the desired depth of cut, and re-tightening the knob 48. The depth of cut is preferably set to about ⅛ inch greater than the thickness of the workpiece material to be cut.

The tool is powered by attachment of the detachable rechargeable battery pack 62. This is most easily accomplished by placing the battery pack 62 into the receptacle 64 in the correct orientation and then pressing it into place; the spring clamps 76 and 78 automatically depress and then lock into position. Alternatively, the spring clamps 76 and 78 may be depressed prior to sliding the battery pack 62 into place in the receptacle 64.

The cutting tool 10 is now prepared for making a cut. While grasping the cutting tool 10 firmly with two hands, one hand grasped around the gripping surface 59 of the handle 14 and the other hand grasped around the motor housing 12, the on/off switch 22 is engaged to turn on the cutting tool 10. The spiral cutting tool bit 32 is thereby rotated at a high speed, e.g., 30,000 RPM, by the electric motor contained within the motor housing 12. The bit 32 may then be plunged into a workpiece or into the side of the workpiece to make a cut therein. A pilot hole or other mark may be used to guide the rotating spiral cutting tool bit 32 into the workpiece. Alternatively, the rotating bit 32 may be plunged into the workpiece material by starting the bit into the material at a 45° angle, and then slowly bringing the axis of the bit to a 90° angle to the material being cut. With the surface 58 of the depth guide 46 pressed against the workpiece surface, the spiral cutting tool 10 is moved in a direction perpendicular to the axis of the cutting tool to cut the workpiece by removing material therefrom Grasping the spiral cutting tool 10 by both the handle 14 and the housing 12 allows a very accurate cut to be made. Use of the handle 14 also enhances user comfort, minimizing user fatigue, and allowing accurate cuts to be made over an extended period of operation of the cutting tool 10.

For operation of the cutting tool 10 in close quarters, the handle may become an obstruction to the making of accurate cuts. For such operating conditions, the handle may be detached by unscrewing connectors 120 by which the handle is attached to the housing 12.

Though described in detail herein with respect to a particular type of spiral cutting tool, it should noted that the present invention is not limited in application to any particular spiral cutting tool designs The detachable rechargeable battery pack of the present invention may be used with other types of spiral cutting tools, or similar hand-held power tools, wherein it is desirable or necessary to work in the absence of a power cord, as for example when the work is done far from a power source. For example, the detachable rechargeable battery pack of the present invention may also be applicable to hand-held routers or similar power tools.

It is thus understood that this invention is not confined to the particular construction herein illustrated and described, but embraces such modified forms thereof as come within the scope of the following claims.

What is claimed is:

1. An improved hand held power tool of the type including a power tool housing enclosing a motor for rotating a shaft that extends from an end of the power tool housing along an axis thereof and means for attaching a bit to the shaft, wherein the power tool is of the type used to remove material from a workpiece by positioning the axis of the power tool housing perpendicular to a surface of the workpiece and moving the power tool housing in a direction perpendicular to the axis of the housing and parallel to the surface of the workpiece to cause the rotating bit to be moved trough the workpiece in a direction perpendicular to an axis of the bit to remove material from the workpiece, the improvement comprising:

(a) a detachable battery pack containing a battery;

(b) a receptacle at the end of the power tool housing opposite to that from which the shaft extends, wherein said receptacle is contoured to form a cavity to accept said battery pack such that the battery pack fits at least partially within the receptacle cavity;

(c) means for detachably attaching and holding the battery pack to the power tool at the receptacle;

(d) electrical connectors by which the battery is electrically connected to the motor; and (e) a handle connected to the power tool housing such that the handle extends outwardly from the housing, and wherein the receptacle includes a portion which extends outwardly beyond the housing over the handle so that when the detachable battery pack is placed in the receptacle a portion of the battery pack extends outwardly from the housing over the handle.

2. The improved hand held power tool of claim 1 wherein the means for detachably attaching the battery pack to the power tool further includes spring clamps.

3. The improved hand held power tool of claim 2 wherein the means for detachably attaching the battery pack further comprises a catch into which the spring clamps of the battery fit snugly.

4. The improved hand held power tool of claim 2 wherein the receptacle includes at least one storage compartment accessible through an aperture in the receptacle.

5. The improved hand held power tool of claim 4 wherein the storage compartment in the receptacle is located on an outer surface of the receptacle and traverses a width of the receptacle.

6. The improved hand held power tool of claim 4 wherein the storage compartment in the receptacle is adapted to receive and hold a spiral cutting tool bit.

7. The improved hand held power tool of claim 4 wherein the aperture in the receptacle is covered by a door attached to the receptacle.

8. The improved hand held power tool of claim 7, wherein the door contains a means for locking the door in place.

9. The improved hand held power tool of claim 8, wherein the means for locking the door into place includes a raised ridge which snaps into place when the door is closed.

10. The improved hand held power tool of claim 1 wherein the receptacle is formed as an integral part of the power tool housing.

11. A spiral cutting tool, comprising:

(a) a spiral cutting tool housing a motor in the housing for rotating a shaft that extends from an end of the spiral cutting tool housing along an axis thereof, a handle connected to the housing and extending outwardly therefrom; and means for attaching a spiral cutting tool bit to the shaft whereby the spiral cutting tool is used to cut a workpiece by positioning the axis of the spiral cutting tool housing perpendicular to a surface of the workpiece and moving the spiral cutting tool housing in a direction perpendicular to the axis of the housing and parallel to the surface of the workpiece to cause the rotating spiral cutting tool bit to be moved through the workpiece in a direction perpendicular to an axis of the spiral cutting tool bit to remove material from the workpiece;

(b) a detachable battery pack containing a battery;

(c) a receptacle at the end of the power tool housing opposite that from which the shaft extends, wherein the receptacle is contoured to form a cavity to accept the battery pack such that the battery pack fits at least partially within the receptacle cavity, and wherein the receptacle extends outwardly beyond the housing over the handle so that a portion of the battery pack extends outwardly from the housing over the handle when the battery pack is received in the receptacle;

(d) means for detachably attaching and holding the battery pack to the receptacle; and (e) electrical connectors by which the battery is electrically connected to the motor.

12. The spiral cutting tool of claim 11 wherein the receptacle includes at least one storage compartment which is accessible through an aperture in the receptacle.

13. The spiral cutting tool of claim 12 wherein the storage compartment in the receptacle is adapted to receive and hold a spiral cutting tool bit.

14. The spiral cutting tool of claim 12 wherein the aperture in the receptacle is covered by a door attached to the receptacle.

15. The spiral cutting tool of claim 14, wherein the door contains a means for locking the door in place.

16. The spiral cutting tool of claim 15, wherein the locking means includes a raised ridge which snaps into place when the door is closed.

17. The spiral cutting tool of claim 11 wherein the means for detachably attaching battery pack to the receptacle includes spring clamps.

18. The improved hand held power tool of claim 5 wherein the storage compartment is accessed by an aperture, and wherein the aperture is covered with a door that is rotatable around and off the aperture.

19. The spiral cutting tool of claim 11 wherein the storage compartment in the receptacle is located on an outer surface of the receptacle and traverses a width of the receptacle, and wherein the aperture is covered with a door that is rotatable around and off the aperture.

* * * * *